(12) United States Patent
Sakthikumar et al.

(10) Patent No.: US 8,428,929 B2
(45) Date of Patent: Apr. 23, 2013

(54) DEMAND BASED USB PROXY FOR DATA STORES IN SERVICE PROCESSOR COMPLEX

(75) Inventors: Palsamy Sakthikumar, Puyallup, WA (US); Michael A. Rothman, Puyallup, WA (US); Vincent J. Zimmer, Federal Way, WA (US); Robert C. Swanson, Olympia, WA (US); Mallik Bulusu, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 326 days.

(21) Appl. No.: 12/894,876

(22) Filed: Sep. 30, 2010

(65) Prior Publication Data

US 2012/0084552 A1    Apr. 5, 2012

(51) Int. Cl.
*G06F 9/455*    (2006.01)
(52) U.S. Cl.
USPC .............................................. 703/24; 703/23
(58) Field of Classification Search .......................... None
See application file for complete search history.

(56) References Cited

U.S. PATENT DOCUMENTS

| | | | | |
|---|---|---|---|---|
| 5,590,312 | A * | 12/1996 | Marisetty | 703/23 |
| 6,775,734 | B2 * | 8/2004 | Chang | 711/2 |
| 2006/0224878 | A1 | 10/2006 | Datta et al. | |
| 2007/0016827 | A1 | 1/2007 | Lopez, Jr. et al. | |
| 2007/0061634 | A1 | 3/2007 | Marisetty et al. | |
| 2010/0169968 | A1 | 7/2010 | Shanbhogue et al. | |
| 2012/0017285 | A1 * | 1/2012 | Piwonka et al. | 726/27 |

FOREIGN PATENT DOCUMENTS

WO    2012/045038 A1    4/2012

OTHER PUBLICATIONS

International Search Report and Written Opinion received for PCT Patent Application no. PCT/US2011/054419, mailed on Mar. 12, 2012, 8 pages.

* cited by examiner

*Primary Examiner* — Omar Fernandez Rivas
*Assistant Examiner* — Herng-Der Day
(74) *Attorney, Agent, or Firm* — D'Ann Naylor Rifai

(57) ABSTRACT

A method, apparatus, system, and computer program product for secure server system management. A payload containing system software and/or firmware updates is distributed in an on-demand, secure I/O operation. The I/O operation is performed via a secured communication channel inaccessible by the server operating system to an emulated USB drive. The secure communication channel can be established for the I/O operation only after authenticating the recipient of the payload, and the payload can be protected from access by a potentially-infected server operating system. Furthermore, the payload can be delivered on demand rather than relying on a BIOS update schedule, and the payload can be delivered at speeds of a write operation to a USB drive.

21 Claims, 3 Drawing Sheets

US 8,428,929 B2

DEMAND BASED USB PROXY FOR DATA STORES IN SERVICE PROCESSOR COMPLEX

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

TECHNICAL FIELD

The present disclosure relates generally to management of computing environments.

BACKGROUND

With the ubiquity of the Internet, the use of server computer systems has proliferated. Server computer systems often provide essential services across a network, either to private users inside a large organization or to public users via the internet. Many servers have dedicated functionality such as web servers, print servers, and database servers. Some businesses maintain hundreds or even thousands of server computer systems in "server farms" or "service processor complexes" that are critical to operations of their business functions.

Enterprise servers are ideally very fault tolerant, for even a short-term failure can cost more than purchasing and installing the system. For example, it may take only a few minutes of down time at a national stock exchange to justify the expense of entirely replacing a failing system with a more reliable system. To increase reliability, most of the servers use memory with error detection and correction, redundant disks, redundant power supplies and so on. Such components are also frequently hot swappable, allowing an administrator to replace them on the running server without shutting the server down. As servers are usually administered by a qualified engineer, server operating systems are also more tuned for stability and performance than for user friendliness and ease of use, with the Linux operating system taking a noticeably larger percentage than for desktop computers. Updates to the server operating system, Basic Input/Output System (BIOS) firmware, and other system firmware must be performed in a secure manner and as quickly as possible.

DETAILED DESCRIPTION

Figure 1:
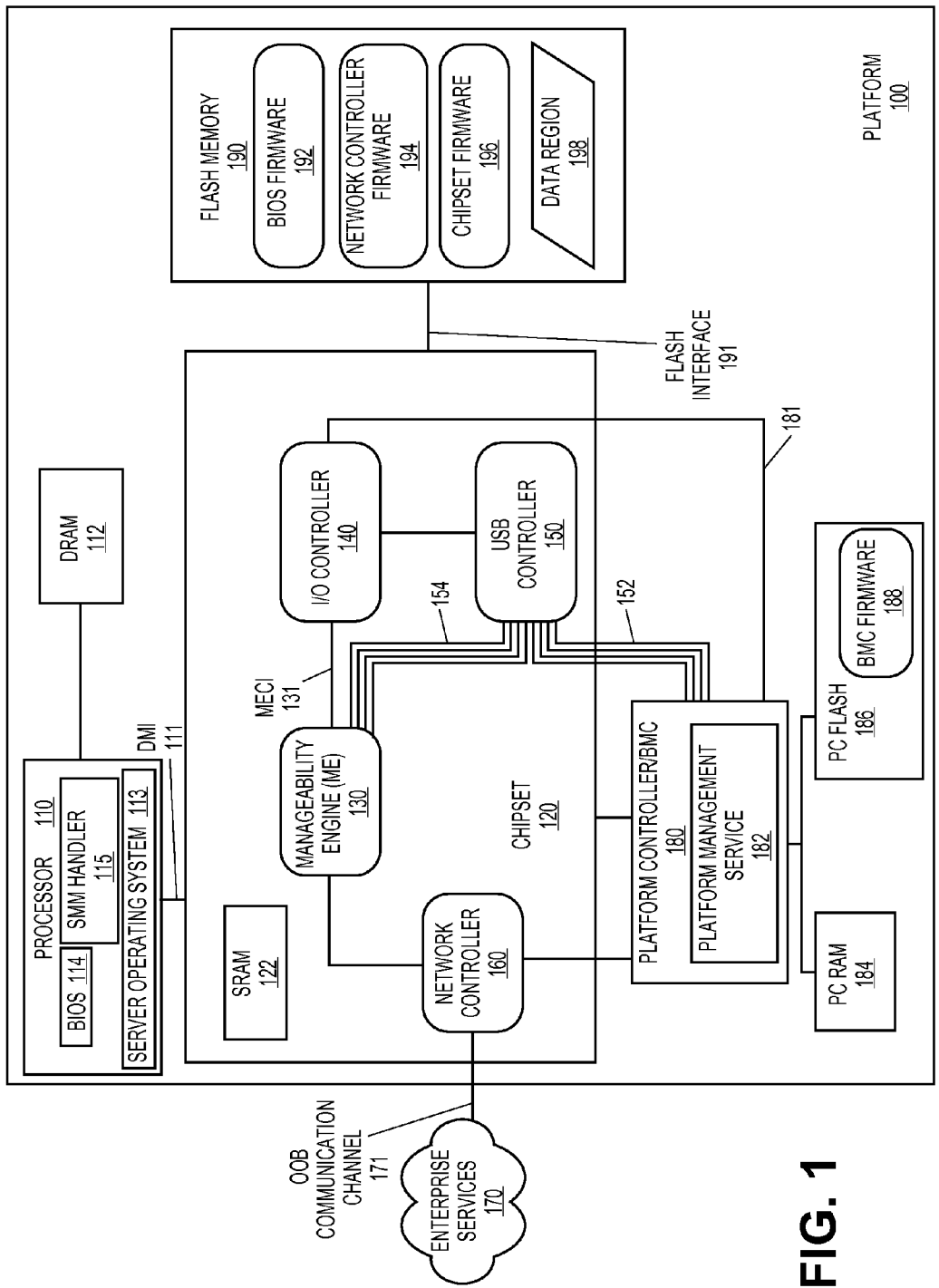
FIG. 1 is a block diagram of a platform configured to enable secure server platform management in accordance with one embodiment of the invention.

Current mechanisms to update server operating system software and/or BIOS and other system firmware are limited to embedding a payload within BIOS firmware that is loaded from flash memory or from a hard drive partition after the operating system has loaded. These updates typically occur when the system is in System Management Mode (SMM), which is a mode of operation of a computer system first released with the Intel 386SL and available in later microprocessors in subsequent Intel architectures. During SMM, all normal execution (including the operating system) is suspended, and special separate software (usually firmware or a hardware-assisted debugger) is executed in high-privilege mode. SMM provides an isolated memory and execution environment, and SMM code is invisible to the operating system yet retains full access to host physical memory and complete control over peripheral hardware.

SMM is normally used to configure the system; to handle system events such memory or chipset errors; to perform system safety functions, such as shutdown upon reaching a high CPU temperature; to perform power management operations, such as turning on fans; and to emulate hardware. Traditionally, SMM is entered to provide service to system management interrupts and then resumes program execution (back to the software stack including executive and application software). Typically, the Basic Input/Output System (BIOS) does not restrict operation of the system while in SMM.

BIOS firmware is typically loaded onto a flash memory device, which has limited space, the size of which varies from system to system. Embedding further changes to system software or firmware as a payload within BIOS firmware or in a hard drive partition therefore requires that the size of the payload be constrained. Furthermore, because the payload can be read by the server operating system once loaded, a security risk exists that the payload may be exposed to a server operating system that has been infected by a virus. One possible solution is to provide a signed version of the payload; however, verifying the signature and reading the payload must be performed in SMM under time constraints for processing a single system management interrupt. These time constraints further limit the ability to distribute payloads containing system software and/or firmware updates for server systems.

A proposed solution to overcome these constraints is to distribute a payload containing system software and/or firmware updates for server systems in an on-demand, secure I/O operation. The I/O operation is performed via a secured communication channel inaccessible by the server operating system from an emulated USB drive. The USB drive is emulated using platform controller RAM and/or flash memory.

Rather than embedding the payload in BIOS firmware and being subject to the size limitations of flash memory or placing the payload into a hard drive partition of limited size, the payload can be of any size. The payload may contain operating system software, a BIOS image, diagnostic software, and/or Unified Extensible Firmware Interface (UEFI) modules. The secure communication channel can be established for the I/O operation only after authenticating the recipient of the payload, and the payload can be protected from access by a potentially-infected server operating system. Furthermore, the payload can be delivered on demand rather than relying on a BIOS update schedule, and the payload can be delivered at speeds of a write operation to a USB drive.

Embodiments of the present invention may provide a method, apparatus, system, and computer program product for securely managing a server platform, including providing updates to BIOS, other system firmware, and the operating system of a server computer system. In one embodiment, a method includes performing the following in a system having a platform controller coupled to an I/O controller capable of generating a System Management Interrupt (SMI): in response to an event requiring secure access to data, generating an SMI to cause the system to enter System Management Mode; using a resource of the platform controller to create an emulated USB device, wherein the resource stores the data; copying the data from the emulated USB device via a connection inaccessible by an operating system of the system; and processing the data prior to exiting System Management Mode. The method may further include authenticating a recipient of the data while in System Management Mode. The method may further include the platform controller asserting an I/O event to the I/O controller. The method may further include the I/O controller receiving the data via the I/O event. In one embodiment, the platform controller is a baseboard management controller. In another embodiment, the platform controller is provided by a manageability engine of a chipset of the system. In one embodiment, the method further includes downloading the data from an enterprise server to the emulated USB drive. The method may further include removing the emulated USB drive from visibility by the operating system prior to the system exiting system management mode. A system and a computer program product with instructions for performing the method are also provided.

Reference in the specification to "one embodiment" or "an embodiment" of the present invention means that a particular feature, structure or characteristic described in connection with the embodiment is included in at least one embodiment of the invention. Thus, the appearances of the phrases "in one embodiment," "according to one embodiment" or the like appearing in various places throughout the specification are not necessarily all referring to the same embodiment.

For purposes of explanation, specific configurations and details are set forth in order to provide a thorough understanding of the present invention. However, it will be apparent to one of ordinary skill in the art that embodiments of the present invention may be practiced without the specific details presented herein. Furthermore, well-known features may be omitted or simplified in order not to obscure the present invention. Various examples may be given throughout this description. These are merely descriptions of specific embodiments of the invention. The scope of the invention is not limited to the examples given.

The term "out-of-band" is used herein to describe communication independent from a main stream, such as communication between a server device and a management module of a client device that is conducted independently of the operating system (OS) of the client device. In this specification, the client device may be a server computer system whereas the server device may be an enterprise management module running on another enterprise management server system.

FIG. 1 is a block diagram of a platform configured to enable secure system management of BIOS and other system firmware, as well as server operating systems, in accordance with one embodiment of the invention. Platform 100, which corresponds to a server computer system, includes a processor 110 connected to a chipset 120 via a desktop management interface (DMI) 111. Processor 110 provides processing power to platform 100 and may be a single-core or multi-core processor, and more than one processor may be included in platform 100. Processor 110 may be connected to other components of platform 100 via one or more system buses, communication pathways or mediums (not shown). Processor 110 may be initialized by loading and running Basic Input/Output System (BIOS) 114, which may then load server operating system 113. During operation, processor 110 may ultimately enter System Management Mode (SMM). An SMM handler 115 is invoked to enter SMM. During SMM, all normal execution (including the operating system 113) is suspended, and special separate software (usually firmware or a hardware-assisted debugger) is executed in high-privilege mode. SMM provides an isolated memory and execution environment, and SMM code is invisible to the server operating system 113 yet retains full access to host physical memory and complete control over peripheral hardware.

Referring again to FIG. 1, platform controller/BMC 180 provides logic to manage an out-of-band interface between enterprise services 170 and platform hardware. For example, platform controller/BMC 180 may be provided by a Baseboard Management Controller (BMC) in accordance with the Intelligent Platform Management Interface (IPMI) architecture. An out-of-band interface such as IPMI operates independently of server operating system 113 running on processor 110 and allows an administrator using system management software to manage platform 100 even in the absence of an operational operating system. In one embodiment, processor 110 operates under the direction of server operating system 113, whereas platform controller/BMC 180 provides a secure and isolated environment that cannot be accessed by server operating system 113. Platform controller/BMC 180 is communicatively coupled to enterprise services 170 via network controller 160 and out-of-band communication channel 171. Out-of-band communication channel 171 enables enterprise services 170 to communicate directly with platform 100 hardware.

Using enterprise services 170, platform controller/BMC 180 maintains consistency with enterprise-wide policies for configuration and management of platforms such as platform 100, including providing a service for server platform management in accordance with one embodiment of the invention. A platform management service 182 may be implemented as firmware executed by platform controller/BMC 180. Platform management service 182 manages BIOS 114, other system firmware, and the server operating system 113. Platform controller/BMC 180 has its own dedicated memory resources, platform controller (PC) RAM 184 and PC flash 186, which includes BMC firmware 188 to initialize platform controller/BMC 180. Platform controller/BMC 180 may also have its own integrated video controller (not shown). The operation of platform management service 182 in conjunction with other components of platform 100 is described further with reference to FIGS. 2 and 3 below.

Referring again to FIG. 1, chipset 120 includes a manageability engine (ME) 130, which may be implemented as an embedded microprocessor that operates independently of processor 110, to manage the configuration and operation of platform 100. In addition to the secure and isolated environment provided by platform controller/BMC 180, manageability engine (ME) 130 may also provide a secure and isolated environment that cannot be accessed by server operating system 113. In one embodiment, manageability engine (ME) 130 authenticates users, controls access to peripheral devices, manages encryption keys for protection of data stored on storage devices of platform 100, and provides an interface to enterprise services 170 via network controller 160.

In an embodiment of the invention without a physical platform controller/BMC 180, manageability engine (ME) 130 may provide the functionality described herein as being provided by platform controller/BMC 180. In such an embodiment, manageability engine (ME) 130 would use its own internal resources to provide server platform management services, such as its own secured RAM (not shown in FIG. 1).

These internal resources may be used, for example, to emulate a USB virtual drive, as further described below with reference to FIGS. 2 and 3.

Referring again to FIG. 1, communication between ME 130 and enterprise services 170 occurs via out-of-band communication channel 171. In one embodiment, out-of-band communication channel 171 is a secure communication channel between the manageability engine (ME) 130 on the server system and enterprise services 170 that manages the server computer system.

In the embodiment shown in FIG. 1, manageability engine (ME) 130 is coupled to I/O controller 140 via a Manageability Engine Controller Interface (MECI) 131. In one embodiment, I/O controller 140 is a general-purpose controller that performs storage command decoding and other accelerated operations. In the embodiment shown, manageability engine (ME) 130 controls the behavior of I/O controller 140, which in turn controls the behavior of USB controller 150. I/O controller 140 is shown as connected to platform controller/ BMC 180 via interconnection 181. USB connection 152 routes physical USB wires from USB controller 150 to platform controller/BMC 180, and USB connection 154 routes physical USB wires from USB controller 150 to manageability engine (ME) 130. USB connections 152 and 154 are used for emulating a USB virtual device, as further described below with reference to FIGS. 2 and 3.

Platform 100 further includes memory devices such as dynamic random access memory (DRAM) 112, static random access memory (SRAM) 122 within chipset 120, and flash memory 190. In addition, as mentioned previously, platform controller/BMC 180 has its own memory devices PC RAM 184 and PC flash 186. These memory devices may include random access memory (RAM) and read-only memory (ROM). For purposes of this disclosure, the term "ROM" may be used in general to refer to non-volatile memory devices such as erasable programmable ROM (EPROM), electrically erasable programmable ROM (EEPROM), flash ROM, flash memory, etc. Other storage devices (not shown) may include mass storage devices such as integrated drive electronics (IDE) hard drives, and/or other devices or media, such as floppy disks, optical storage, tapes, flash memory, memory sticks, digital video disks, biological storage, etc.

Flash memory 190 is accessible by chipset 120 via flash interface 191. Data stored in memory devices DRAM 112, SRAM 122, and flash memory 190 may be encrypted. Similarly, data stored in PC RAM 184 and PC flash 186 may be encrypted.

Flash memory 190 contains firmware used to initialize platform 100. This initialization firmware includes Basic Input/Output System (BIOS) firmware 192 to identify and initialize system component hardware (such as the video display card and hard disk) and some other hardware devices including manageability engine (ME) 130. BIOS firmware 192 prepares system component hardware of platform 100 to operate in a known low capability state, so other software programs stored on various media, including an operating system, can be loaded, executed, and given control of platform 100. BIOS firmware 192 may include a BIOS/ME communication module (not shown), which enables the initial configuration of manageability engine (ME) 130 during the boot process. In one embodiment, manageability engine (ME) 130 registers with a BIOS/ME communication module to receive a notification just before an operating system is loaded for platform 100. This notification enables manageability engine (ME) 130 to perform certain instructions in preparation for the operating system being loaded.

Flash memory 190 also includes network controller firmware 195 to configure network controller 160, and chipset firmware 196 to configure chipset 120. Flash memory 190 also contains a data region 198. In one embodiment, data region 198 is encrypted and may only be read by manageability engine (ME) 130. Information used by ME 130 to provide services may be stored in data region 198 of flash memory 190.

Processor 110 may also be communicatively coupled to additional components, such as video controllers, small computer system interface (SCSI) controllers, network controllers, universal serial bus (USB) controllers, input devices such as a keyboard and mouse, etc. Platform 100 may also include one or more bridges or hubs, such as a memory controller hub, additional input/output (I/O) controller hubs, a PCI root bridge, etc., for communicatively coupling various system components. As used herein, the term "bus" may be used to refer to shared communication pathways, as well as point-to-point pathways.

Some components, such as network controller 160 for example, may be implemented as adapter cards with interfaces (e.g., a PCI connector) for communicating with a bus. In one embodiment, one or more devices may be implemented as embedded controllers, using components such as programmable or non-programmable logic devices or arrays, application-specific integrated circuits (ASICs), embedded computers, smart cards, and the like.

As used herein, the terms "processing system" and "data processing system" are intended to broadly encompass a single machine, or a system of communicatively coupled machines or devices operating together. Example processing systems include, without limitation, distributed computing systems, supercomputers, high-performance computing systems, computing clusters, mainframe computers, mini-computers, client-server systems, personal computers, workstations, servers, portable computers, laptop computers, tablets, telephones, personal digital assistants (PDAs), handheld devices, entertainment devices such as audio and/or video devices, and other devices for processing or transmitting information.

Platform 100 may be controlled, at least in part, by input from conventional input devices, such as keyboards, mice, etc., and/or by commands received from another machine, biometric feedback, or other input sources or signals. Platform 100 may utilize one or more connections to one or more remote data processing systems, such as through a network interface controller (NIC) 160, a modem, or other communication ports or couplings.

Platform 100 may be interconnected to other processing systems (not shown) by way of a physical and/or logical network, such as a local area network (LAN), a wide area network (WAN), an intranet, the Internet, etc. Communications involving a network may utilize various wired and/or wireless short range or long range carriers and protocols, including radio frequency (RF), satellite, microwave, Institute of Electrical and Electronics Engineers (IEEE) 802.11, Bluetooth, optical, infrared, cable, laser, etc.

Figure 2:
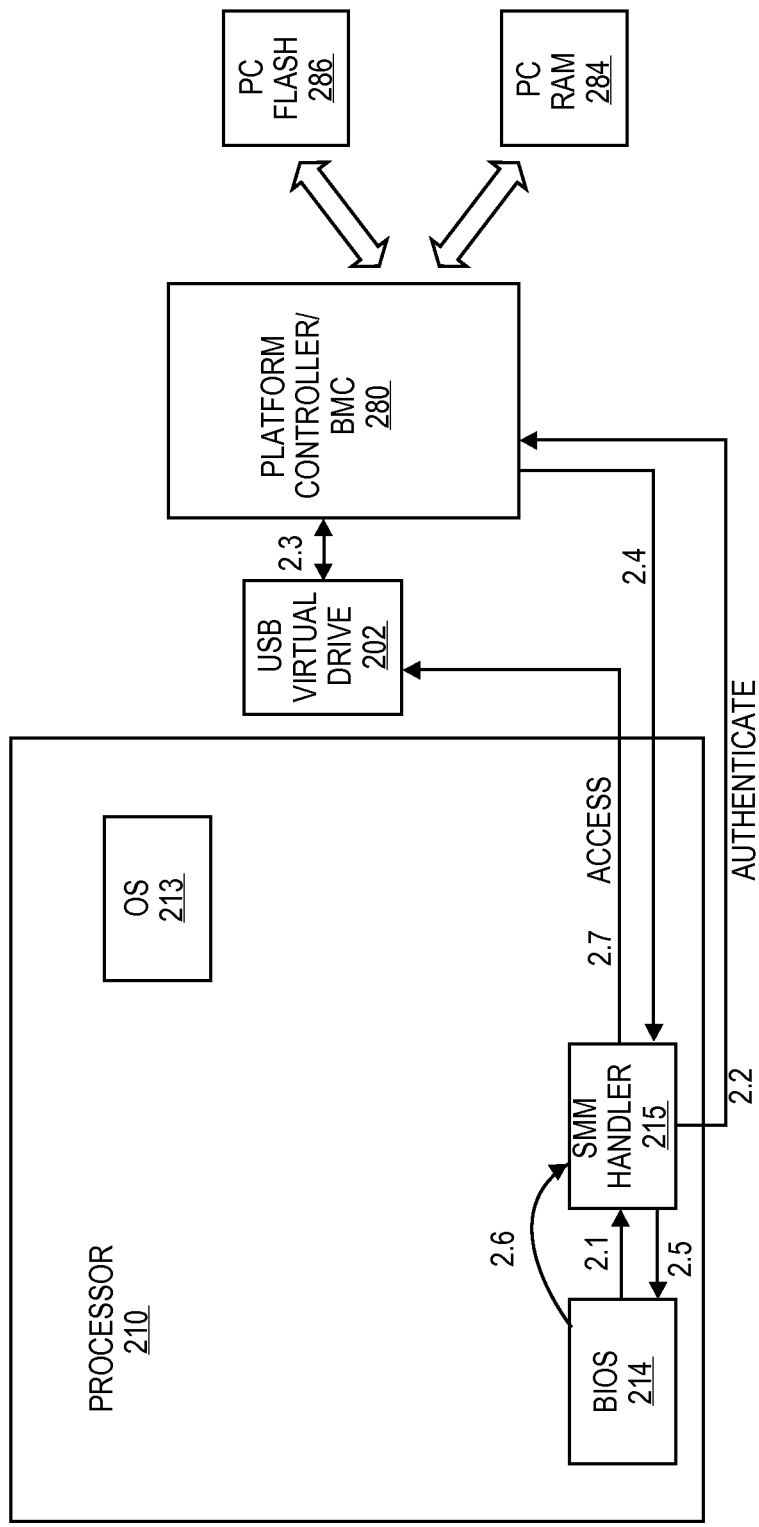
FIG. 2 is a flow diagram showing operation of components of the system of FIG. 1 in providing a secure server platform management service in accordance with one embodiment of the invention.

Referring to FIG. 2, a flow diagram showing operation of components of the system of FIG. 1 is shown for providing a secure server platform management service in accordance with one embodiment of the invention. The process begins when BIOS 214 processes an event requiring secure platform management services, such as receiving an I/O operation that requires access to programs or data managed by platform controller/BMC 280. For example, platform controller/BMC 280 may have made a new version of BIOS firmware available by copying the BIOS firmware into secure memory such as PC RAM 284 and/or unused portions of PC flash 286. Platform controller/BMC 280 may have then triggered an I/O operation that would cause BIOS 214 to read the new BIOS firmware.

To receive the services of platform controller/BMC 280 and to ensure that operating system 213 will not have access to the communication with platform controller/BMC 280, BIOS 214 causes processor 210 to be placed into System Management Mode (SMM). BIOS 214 certifies to platform controller/BMC 280 that processor 210 has been placed into SMM. Communication between BIOS 214 and platform controller/BMC 280 occurs only upon authentication of the credentials of BIOS 214. These credentials may be established by an exchange of information upon system initialization and prior to loading an operating system 213. These credentials may take the form of a randomly-generated identifier provided by platform controller/BMC 280 to BIOS 214 and may only be used for a single boot session. Other forms of usernames and passwords may also be used to authenticate BIOS 214 and to indicate that processor 210 has been placed into SMM.

In response to identifying a need for secure platform management services, in action 2.1, BIOS 214 calls SMM handler 215 with a request to enter System Management Mode (SMM) and with a username and password for authentication purposes. In one embodiment, the request to enter SMM is issued in accordance with the Intelligent Platform Management Interface (IPMI) SMM interface. In action 2.2, SMM handler 215 calls platform controller/BMC 280, passing along the username and password. Upon receiving the username and password, platform controller/BMC 280 authenticates the caller, which may be performed in accordance with the IPMI authentication interface. If the caller is authenticated, in action 2.3, platform controller/BMC 280 begins emulation of USB virtual drive 202 using resources of PC RAM 284 and PC flash 286. In action 2.4, platform controller/BMC 280 provides status information to SMM handler 215, and in action 2.5, SMM handler 215 passes the device status information back to BIOS 214. In response to the device status information, BIOS 214 begins to discover USB devices in the subsystem associated with the physical USB ports tied to platform controller/BMC 280. In action 2.6, BIOS 214 requests to access USB virtual drive 202 via SMM handler 215. Once BIOS 214 has set up communication with USB virtual drive 202, in action 2.7, BIOS 214 communicates via SMM handler 215 using normal USB commands at USB 3.0 speeds (4 gigabits/second or effective transfer of 3.2 gigabits/second) to transfer the data into TSEG (or other protected and secure portions of RAM such as DRAM 112 of FIG. 1). Once BIOS 214 has completed the transfer of the data into memory, BIOS 214 sends an acknowledgement to platform controller/BMC 280. In response to the acknowledgement, platform controller/BMC 280 will remove the device from the visibility of the host, including operating system 213, and SMM handler 215. BIOS 214 will then resume from SMM to the host domain. Because all processing of data occurred while processor 210 was in SMM, server operating system 113 is unaware of USB virtual device 202 and the communication that has occurred.

In another embodiment, the I/O operation may be initiated by platform controller/BMC 180 upon receiving instructions from enterprise services 170 of FIG. 1. In such a scenario, platform controller/BMC 280 would cause the system to enter SMM, write the data to the emulated USB drive, and then notify BIOS 214 to read the data provided.

Figure 3:
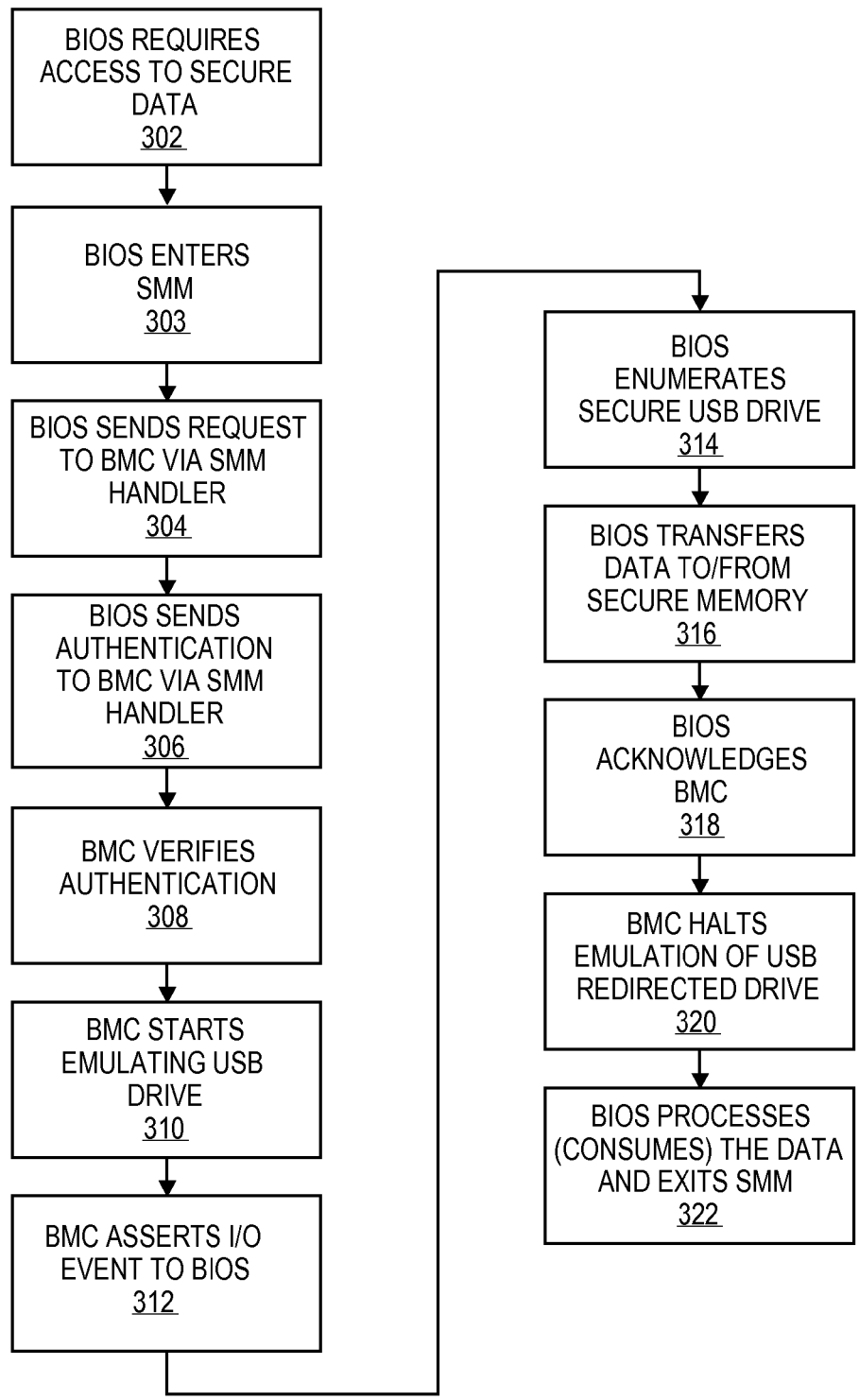
FIG. 3 is a flowchart of the operation of components of the system of FIG. 1 in providing a secure server platform management service in accordance with one embodiment of the invention.

Referring to FIG. 3, a flowchart of the operation of components of the system of FIG. 1 is shown for providing a secure platform management service in accordance with one embodiment of the invention. The operations of FIG. 3 will be described as being performed by the system components of FIG. 2. The process begins when BIOS 214 processes an event requiring secure platform management services, such as receiving an I/O operation that requires access to programs or data managed by platform controller/BMC 280. In "BIOS Requires Access to Secure Data" step 302, BIOS 214 makes a determination that access to secure platform management services is needed. Control proceeds to "BIOS Enters SMM" step 303, where BIOS 214 issues a System Management Interrupt (SMI) to cause processor 210 to enter System Management Mode (SMM).

Control proceeds to "BIOS Sends Request to BMC via SMM Handler" step 304, where BIOS 214 sends a request to access secure data. Control proceeds to "BIOS Sends Authentication to BMC via SMM handler" step 306, where BIOS 214 sends authentication information, such as a username and password, to SMM handler 215. SMM handler 215 passes the authentication information to platform controller/BMC 280. In one embodiment, the authentication request is provided in accordance with the IPMI authentication interface. Control then proceeds to "BMC Verifies Authentication" step 308, where platform controller/BMC 280 authenticates the recipient. In performing this authentication, platform controller/BMC 280 confirms that platform 100 is operating in System Management Mode (SMM) and that the request originated with a general purpose I/O controller (such as I/O controller 140 of FIG. 1) that is connected to platform controller/BMC 280.

From "BMC Verifies Authentication" step 308, control proceeds to "BMC Starts Emulating USB Drive" step 310, where platform controller/BMC 280 begins to emulate a USB virtual drive. In emulating a USB drive, platform controller/BMC 280 uses its resources PC RAM 284 and free space within PC Flash 286 to provide memory for a USB virtual drive.

Control then proceeds to "BMC Asserts I/O Event to BIOS" step 312, where platform controller/BMC 280 asserts an I/O event to BIOS 214 via SMM handler 215. Control then proceeds to "BIOS Enumerates Secure USB Drive" step 314. BIOS 214 further enumerates devices that are visible to it, which now includes USB virtual drive 202.

Control then proceeds to "BIOS Transfers Data To/From Secure Memory" step 316, where BIOS 214 then performs the I/O operation using the emulated USB virtual drive 202. When the I/O operation is completed from the USB virtual drive, control proceeds to "BIOS Acknowledges BMC" step 318, where BIOS 214 acknowledges the I/O event to platform controller/BMC 280, indicating that BIOS 214 has completed the I/O event. When platform controller/BMC 280 receives the acknowledgement from BIOS 214, platform controller/BMC 280 halts emulation of the USB redirected drive in "BMC Halts Emulation of USB Redirected Drive" step 320. Control then proceeds to "BIOS Processes (Consumes) the Data and Exits SMM" step 322, where BIOS 214 processes and/or consumes the data from the I/O operation. For example, if the I/O operation delivered an update to BIOS firmware, BIOS 214 may overwrite BIOS firmware 192 in flash memory 190 of FIG. 1. Alternatively, BIOS 214 may write the data to other memory and process the data later under a different System Management Interrupt (SMI). When consumption of the data is complete, processor 210 exits SMM.

With the high speed bandwidth of USB 3.0, a large payload can be delivered while still complying with operating system System Management Interrupt (SMI) timeout limitations.

Platform controller/BMC 280 can host operating system updates, BIOS firmware updates, diagnostic software, and other system firmware updates without regard to size constraints or BIOS update schedules. Out-of-band BIOS update and/or BIOS recovery can be achieved.

Another advantage of using a resource such as PC RAM 284 of platform controller/BMC 280 to store the data is that the data will be preserved in PC RAM 284 until power is disconnected, which happens rarely for server computer systems.

Embodiments of the mechanisms disclosed herein may be implemented in hardware, software, firmware, or a combination of such implementation approaches. Embodiments of the invention may be implemented as computer programs executing on programmable systems comprising at least one processor, a data storage system (including volatile and non-volatile memory and/or storage elements), at least one input device, and at least one output device.

Program code may be applied to input data to perform the functions described herein and generate output information. Embodiments of the invention also include machine-accessible media containing instructions for performing the operations of the invention or containing design data, such as HDL, which defines structures, circuits, apparatuses, processors and/or system features described herein. Such embodiments may also be referred to as program products.

Such machine-accessible storage media may include, without limitation, tangible arrangements of particles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash programmable memories (FLASH), electrically erasable programmable read-only memories (EEPROMs), magnetic or optical cards, or any other type of media suitable for storing electronic instructions.

The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The programs may be implemented in a high level procedural or object oriented programming language to communicate with a processing system. The programs may also be implemented in assembly or machine language, if desired. In fact, the mechanisms described herein are not limited in scope to any particular programming language. In any case, the language may be a compiled or interpreted language.

Presented herein are embodiments of methods and systems to manage server platforms. While particular embodiments of the present invention have been shown and described, it will be obvious to those skilled in the art that numerous changes, variations and modifications can be made without departing from the scope of the appended claims. Accordingly, one of skill in the art will recognize that changes and modifications can be made without departing from the present invention in its broader aspects. The appended claims are to encompass within their scope all such changes, variations, and modifications that fall within the true scope and spirit of the present invention.

What is claimed is:

1. A computer-implemented method comprising:
   in a system having a platform controller coupled to an I/O controller capable of generating a System Management Interrupt (SMI), performing the following:
   in response to an event requiring secure access to data, generating an SMI to cause the system to enter System Management Mode;
   using a resource of the platform controller to create an emulated USB device, wherein the resource stores the data;
   copying the data from the resource using the emulated USB device via a connection inaccessible by an operating system of the system; and
   processing the data prior to exiting System Management Mode.

2. The method of claim 1, further comprising:
   authenticating a recipient of the data while in System Management Mode.

3. The method of claim 1 wherein
   the platform controller is a baseboard management controller.

4. The method of claim 1 wherein
   the platform controller is provided by a manageability engine of a chipset of the system.

5. The method of claim 1 further comprising:
   downloading the data from an enterprise server to the resource using the emulated USB device.

6. The method of claim 1 further comprising:
   removing the emulated USB device from visibility by the operating system prior to exiting System Management Mode.

7. The method of claim 1 wherein
   using the resource of the platform controller to create the emulated USB device is performed in response to a request to access the data.

8. A system comprising:
   a processor;
   a platform controller;
   an I/O controller capable of generating a System Management Interrupt (SMI);
   a memory coupled to the processor, the memory comprising instructions for performing the following:
   in response to an event requiring secure access to data, generating an SMI to cause the system to enter System Management Mode;
   using a resource of the platform controller to create an emulated USB device, wherein the resource stores the data;
   copying the data from the resource using the emulated USB device via a connection inaccessible by an operating system of the system; and
   processing the data prior to exiting System Management Mode.

9. The system of claim 8, wherein the instructions further perform the following:
   authenticating a recipient of the data while in System Management Mode.

10. The system of claim 8 wherein
    the platform controller is a baseboard management controller.

11. The system of claim 8 wherein
    the platform controller is provided by a manageability engine of a chipset of the system.

12. The system of claim 8 wherein the instructions further perform the following:

downloading the data from an enterprise server to the resource using the emulated USB device.

13. The system of claim 8, wherein the instructions further perform the following:
removing the emulated USB device from visibility by the operating system prior to exiting System Management Mode.

14. The system of claim 8 wherein
using the resource of the platform controller to create the emulated USB device is performed in response to a request to access the data.

15. A computer program product comprising:
a non-transitory computer-readable storage medium; and
instructions in the non-transitory computer-readable storage medium, wherein the instructions, when executed in a processing system having a platform controller coupled to an I/O controller capable of generating a System Management Interrupt (SMI), cause the processing system to perform operations comprising:
in response to an event requiring secure access to data, generating an SMI to cause the system to enter System Management Mode;
using a resource of the platform controller to create an emulated USB device, wherein the resource stores the data;
copying the data from the resource using the emulated USB device via a connection inaccessible by an operating system of the system; and
processing the data prior to exiting System Management Mode.

16. The computer program product of claim 15, wherein the instructions further perform the following:
authenticating a recipient of the data while in System Management Mode.

17. The computer program product of claim 15 wherein
the platform controller is a baseboard management controller.

18. The computer program product of claim 15 wherein
the platform controller is provided by a manageability engine of a chipset of the system.

19. The computer program product of claim 15 wherein the instructions further perform the following:
downloading the data from an enterprise server to the resource using the emulated USB device.

20. The computer program product of claim 15, wherein the instructions further perform the following:
removing the emulated USB device from visibility by the operating system prior to exiting System Management Mode.

21. The computer program product of claim 15 wherein
using the resource of the platform controller to create the emulated USB device is performed in response to a request to access the data.

\* \* \* \* \*